June 1, 1948.　　　R. R. CURTIS　　　2,442,639
AIRCRAFT BOOSTER PUMP AND TANK ASSEMBLY
Filed March 8, 1943
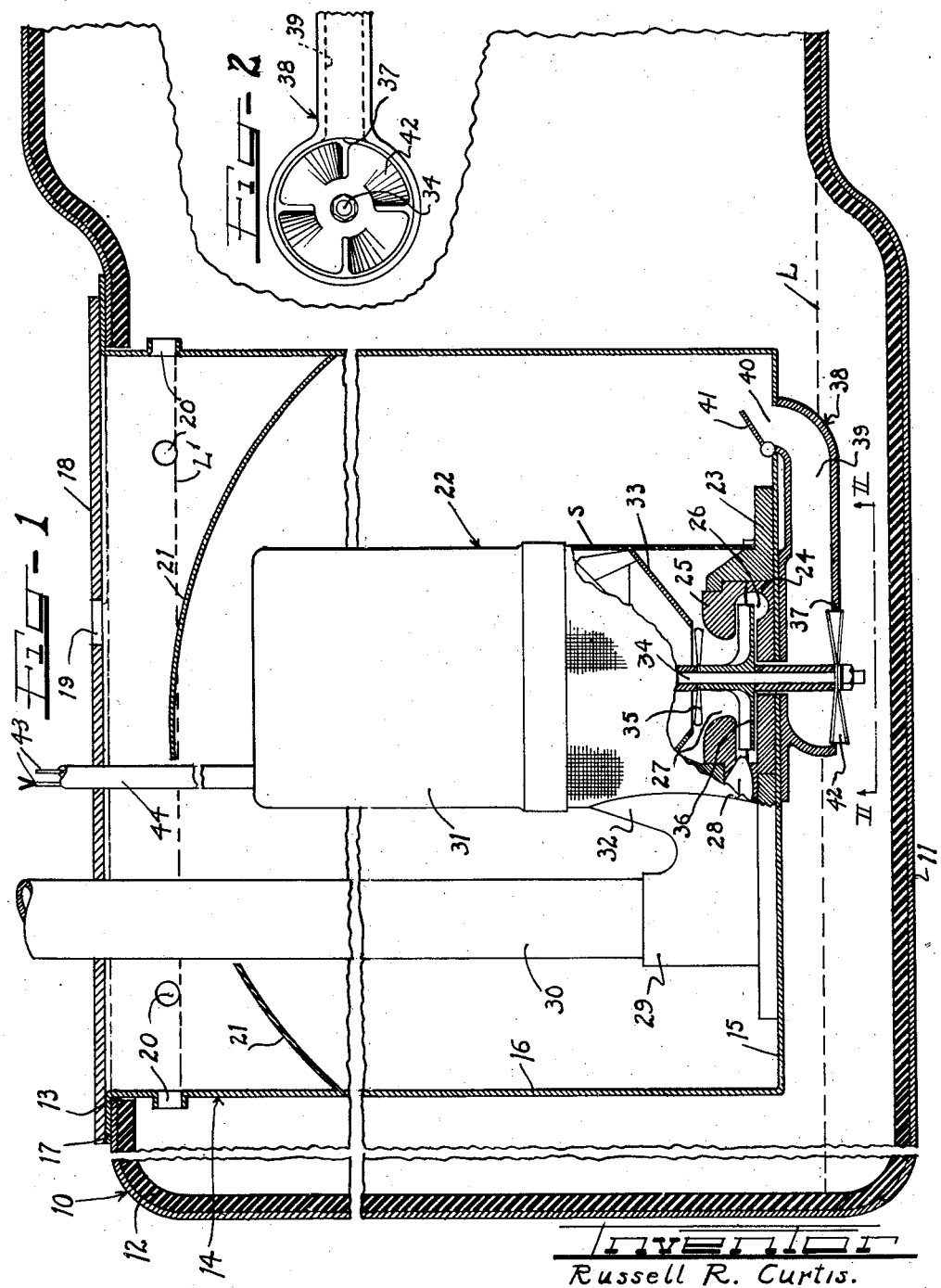
Inventor
Russell R. Curtis.

Patented June 1, 1948

2,442,639

UNITED STATES PATENT OFFICE 2,442,639

AIRCRAFT BOOSTER PUMP AND TANK ASSEMBLY

Russell R. Curtis, Dayton, Ohio, assignor to Curtis Pump Company, Dayton, Ohio, a corporation of Ohio Application March 8, 1943, Serial No. 478,363

14 Claims. (Cl. 158—36.3)

This invention relates to tank and pump arrangements especially adapted for aircraft fuel systems, to insure continuous delivery of pumped material from the tank, even though material in the tank is violently disturbed as during periods of quick maneuvering of the aircraft away from straight level flying conditions.

Specifically, the invention relates to a booster pump and airplane fuel tank arrangement for maintenance of an appreciable head of fuel covering the booster pump inlet and especially adapted for use in bullet-proof bag-lined aircraft fuel tanks.

Because it is very difficult to incorporate baffles within bullet-proof bag-lined aircraft fuel tanks, the problem of preventing the uncovering of fuel ports to the fuel lines of the airplane as the aircraft maneuvers is very serious. In aircraft fuel systems including booster pumps either submerged in or mounted on the fuel tank, it is quite important that the inlets of these pumps be always submerged in or covered with fuel, to prevent admission of gases and vapors into the fuel line with the attendant possibility of developing vapor lock in the fuel line.

According to this invention, a centrifugal type booster pump is attached to the bottom of a relatively large cylinder suspended from the top of an aircraft fuel tank. This aircraft fuel tank, as is customary in military aircraft, is lined with a bullet-proof bag and the bullet-proof bag itself is not capable of supporting baffles for retention of a pond of fuel over the inlet of the booster pump. However, the bullet-proof bag can have a large opening therethrough in the top thereof for receiving the pump-containing and supporting cylinder.

The cylinder is suspended in spaced relation above the bottom of the bullet-proof bag, or at least above a sump portion of the bag, and has an inlet passageway for conveying fuel from the tank into the cylinder. The booster pump is equipped with an auxiliary propeller operating in the mouth of this passageway to deliver fuel from the bottom of the tank into the cylinder. A head of fuel can always be maintained in the cylinder at a level above the inlet mouth of the pump so that, even though fuel in the main portion of the tank is drained to a low level, the booster pump inlet will receive fuel at a higher head pressure thereby increasing the high altitude performance and range of the fuel system.

The suspended cylinder or tank need not be lined with a bullet-proof bag, since it is inside of the bullet-proof tank. Therefore, the side walls of the suspended cylinder or tank can carry baffles capable of retaining a pond of fuel in the cylinder sufficient to cover the inlet of the pump even though the aircraft is subjected to violent maneuvers.

The bullet-proof tank is vented to the interior of the suspended cylinder or tank at the top of the cylinder, and the cylinder, in turn, is vented to the atmosphere.

The booster pump can have an electric driving motor connected therewith to form a compact unit mounted on the bottom wall of the suspended cylinder and adapted to be completely submerged in fuel. A tube for housing the electric wires to the motor can extend through the cylinder to the motor casing and the fuel line from the booster pump can also extend through the cylinder to emerge at the top end thereof.

It is, then, an object of the invention to provide a pump and tank arrangement capable of suspension in a main tank to receive fluid from the main tank in sufficient amounts to always cover the pump inlet.

A further object of the invention is to provide an aircraft fuel system with a nested tank assembly for maintenance of a head of fuel above the inlet of a fuel pump in the assembly.

A still further object of the invention is to provide a bullet-proof tank assembly with a suspended tank therein carrying baffles and receiving fuel from the bullet-proof tank to insure continuous delivery of fuel.

A still further object of the invention is to provide an aircraft bullet-proof tank assembly which will maintain a pond of fuel above the delivery port from the tank even during periods of violent maneuvering of the aircraft.

A further object of the invention is to provide a booster pump adapted for an aircraft fuel system which pumps fuel from the main tank to an auxiliary tank and receives fuel from the auxiliary tank to pressure the same into a fuel delivery line freed from bubbles of gas and vapor.

Another object of the invention is to provide a booster pump of the centrifugal type with an auxiliary propeller for transferring fuel from one tank to another.

A still further object of the invention is to provide a booster pump having an impeller shaft, an impeller thereon, a volute chamber surrounding the impeller having an inlet mouth adapted to be covered by fluid, a propeller in advance of the inlet mouth, and a second propeller beneath the impeller adapted to supply fluid to the inlet mouth from a level below said inlet mouth.

Other and further objects of the invention will be apparent to those skilled in the art from the following detailed description of the annexed sheet of drawings which, by way of preferred example only, illustrates one embodiment of the invention.

On the drawings:

Figure 1 is a broken fragmentary vertical cross-sectional view, with parts in elevation, of a bullet-proof airplane wing tank equipped with a baffled booster pump supporting tank insert in accordance with this invention.

Figure 2 is a plan view taken along the line II—II of Figure 1.

As shown on the drawings:

In Figure 1 the reference numeral 10 designates generally an airplane wing tank having a sump portion 11 and lined with a bullet-proof bag 12. A relatively large cylindrical opening 13 is provided in the top of the tank and bag giving access to the interior of the tank.

A relatively large metal cylinder or inside tank 14 is inserted through this opening 13 and is suspended in the tank 10 above the sump portion 11 thereof. The cylinder 14 has a bottom 15 adjacent the sump portion 11 of the tank 10 and a cylindrical side wall 16 extending upwardly from the bottom 15 through the opening 13 and terminating in an outturned flange 17 resting on top of the top wall of the tank 10. Thus the cylindrical tank 14 is suspended in the tank 10 in spaced relation above the bottom thereof. A cover 18 either integral with or secured to the tank 14 is provided for closing the top of the tank, and this cover has a vent opening 19 therethrough venting the interior of the tank 14 with the atmosphere.

The side walls 16 of the tank 14 have openings 20 therearound near the top thereof joining the interior of the tank 14 with the interior of the tank 10. These side walls 16 also carry curved baffles 21 that are attached to said side walls at levels beneath the openings 20. These baffles are concavo-convex in section and project upwardly from the wall 16 to extend into the tank 14 and serve to retain a localized pond of fuel in the tank even when the aircraft is violently maneuvered so that the fuel in the cylindrical tank 14 would be liable to be discharged out through the holes 20, back to the tank 10.

The bottom wall 15 of the tank 14 supports an electric motor-driven booster pump unit 22. This unit 22 is mounted inside of the tank 14 and includes a base 23 seated on the wall 15 and carrying therein members 24 and 25 which cooperate to define a pump volute chamber 26 and a central inlet throat 27 to said volute chamber. A passageway 28 connects the volute chamber 26 with a hollow boss 29 formed on the base which boss 29 receives a fuel pipe 30 extending upwardly through the tank 14 and out through the cover 18, as shown.

A motor casing 31 is supported above the base 23 through an upstanding post or pedestal 32. The motor casing is in spaced relation above the inlet throat 27 and a guide cone 33 can be suspended from this motor casing to overlie the inlet 27. A wire mesh screen S surrounds the guide cone and extends from the motor casing 31 down to the base 23 upon which it is bottomed to surround the pump inlet throat 25.

A motor shaft 34 extends from the casing 31 through the guide cone 33 and carries a propeller 35 between the small end of the guide cone and the inlet throat 27.

An impeller 36 is mounted on the shaft 34 to operate in the volute chamber 26 for propelling fuel from the inlet 27 to the volute chamber 26 and thence through the passageway 28 into the boss 29 and fuel line 30.

The shaft 34 extends through the bottom wall 15 of the tank 14 and through the mouth 37 of a casing 38 secured on the bottom wall 15 on the outside of the tank 14 to provide a passageway 39 joining the mouth 37 with a discharge port 40 also in the bottom wall 15 and positioned alongside of the unit 22. A flap-type check valve 41 controls the port 40 to prevent drainage of fuel from inside of the tank back through the passageway 39, as when the propeller 42 is not submerged in fuel. This condition can occur when the aircraft is maneuvering and fuel in the tank 10 flows away from the mouth 37 to expose the propeller to air or vapor in the tank.

A propeller or impeller 42 is mounted on the shaft 34 to operate in the mouth 37 of the casing 38.

The electric motor in the casing 31 can be energized through wires 43 from a battery or other suitable source of current on the aircraft and a pipe or tube 44 is provided to extend from the motor casing 31 through the tank 14 and cover 18 for receiving the wires 43 therethrough.

When the booster pump unit 22 is being operated, the propeller 42, of course, is driven in the mouth 37 of the casing 38 and is effective to propel fuel from a level as low as L in the sump portion 11 of the main tank 10 through the passageway 39 into the tank 14 to a level L' at the overflow openings or ports 20. This level L' is well above the inlet throat 27 and the top of the guide cone 33. It is desired to pump an excess of fuel into the tank 14 so that there will be a constant overflow of fuel through the ports 20 back to the tank 10. This will insure maintenance of a high fuel level in the tank 14. Fuel in the tank 14 which passes through screen S flows through the guide cone 33 to be acted on by the propeller 35. This propeller is effective to create a lateral stream of bubble-rich fuel containing bubbles of gas and vapor. This bubble-rich fuel is thus rejected by the propeller away from the inlet throat 27 of the pump. The bubbles will rise along the outer surface of the cone 33 and back through the screen S which as explained above, is disposed around the cone and inlet throat of the booster pump. The bubbles will continue to rise through the pond of fuel in the tank 14 and will burst at the surface of this pond to liberate their included gases and vapors. The gases and vapors are vented out of the system through the vent 19. The propeller 42 is effective to pump more fuel into the tank 14 than is required to meet the demands of the booster pump, so that the level L' will always be above the inlet throat 27, and preferably above the top of the guide cone 33. Excess fuel in the tank 14 can flow back to the tank 10 through the ports 20 in the tank 14. Likewise these ports 20 are effective to vent the tank 10 and relieve gases and vapors therefrom into the tank 14 and thence out of the system out of the vent 19.

Bubble-freed fuel entering the inlet throat 27 is acted on by the impeller 36 and is pressured in and through the volute chamber 26 to the hollow boss 29 and thence through the tube 30 to an engine-driven pump (not shown) for supplying the aircraft engine carburetor.

The flap valve or check valve 41 is effective to maintain fuel in the tank 14 even when the propeller 42 is not operating, because the head of fuel in the tank 14 will close the valve and prevent drainage back to the tank 10. If desired, the flap or check valve 41 can be urged to closed position by a light spring.

During periods of violent maneuvering of the airplane, the baffles 21 in the tank 14 are effective to restrain a pond of liquid in the tank sufficient to cover the inlet throat 27.

The feature of maintaining a head of fuel above the inlet throat even though the fuel level in the main tank 10 is materially below this inlet throat makes possible better high altitude performance of the fuel systems of this invention because the booster pump will always receive fuel under a head pressure. Bubble-elimination and pressure operation of the booster pump is thereby facilitated.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination a main tank, a secondary tank suspended in said main tank and terminating in spaced relation above the bottom of the main tank, a booster pump and motor unit supported in said secondary tank on the bottom thereof, the bottom of said secondary tank having means defining a passageway with an inlet mouth communicating with the bottom portion of the main tank and a discharge outlet communicating with the interior of the secondary tank, said booster pump and motor unit including a motor-driven shaft extending to said inlet mouth, a pumping chamber surrounding said shaft having an inlet throat communicating with the interior of the secondary tank and a discharge outlet communicating with the exterior of the main tank, a propeller on said shaft adjacent the inlet throat for throwing bubble-rich material away from the inlet throat, an impeller on said shaft in said pumping chamber for pressuring material received from the inlet throat to the discharge outlet, and pumping means on said shaft in the inlet mouth of said passageway-defining means for propelling material from the main tank into the secondary tank, said pumping means being effective to supply said secondary tank with material from the main tank in excess of the amount of material pumped by said impeller to maintain the inlet throat covered with said material.

2. An aircraft tank assembly comprising a main tank having top, bottom and side walls, a bullet-proof bag lining said main tank, said main tank and bullet-proof bag having a large aperture in the top wall thereof, a secondary tank extending through said large aperture into said bullet-proof bag of the main tank and supported by said top wall of the main tank, said secondary tank having a fuel discharge port therein, baffle means in said secondary tank adapted to retain fuel therein for covering said discharge port even when the aircraft is being violently maneuvered, and means for supplying fluid from the bullet-proof bag to the secondary tank.

3. An aircraft tank assembly comprising a bullet-proof lined main tank, a secondary tank supported in said main tank, pumping means in said secondary tank having an inlet throat adapted to receive fuel from the secondary tank, baffles in said secondary tank for maintaining the inlet throat of said pumping means covered with fuel even when the aircraft is violently maneuvering, and means for supplying said secondary tank with fuel from said main tank in excessive amounts to maintain the inlet throat covered with fuel.

4. An aircraft booster pump and tank arrangement comprising a main fuel tank having top, bottom and side walls with a large aperture through the top wall, a secondary tank extending into the main tank through said large aperture having an outturned flange around the top thereof mounted on the top wall of the main tank, said secondary tank having ports therein joining the interior thereof with the main tank near the top wall of the main tank, said secondary tank having a bottom wall adjacent the bottom wall of the main tank, a booster pump mounted in said secondary tank on said bottom wall, means for pumping fuel from the lower portion of said main tank into said secondary tank to supply said booster pump, and baffles in said secondary tank between said booster pump and said ports for retaining a pond of fuel in the secondary tank sufficiently to cover the inlet of the booster pump even when the aircraft is violently maneuvering.

5. An aircraft tank assembly comprising a main tank having a bottom sump portion, a secondary tank suspended from the top of the main tank to extend into the main tank to a level adjacent said sump portion, a booster pump in said secondary tank, a vapor-separating propeller on said booster pump, an atmospheric vent in said secondary tank for eliminating the separated vapors, and pumping means for propelling fluids from the sump portion of the main tank into the secondary tank to supply said booster pump.

6. A booster pump and tank assembly comprising a tank having a bottom wall, a motor and pump assembly in said tank on said bottom wall, said assembly including a motor-driven shaft extending through said bottom wall, an impeller on said shaft in said tank cooperating with the pumping assembly, and a propeller outside of said tank on said shaft for pumping fluid into said tank.

7. The method of preventing vapor lock in the fuel system of an internal combustion engine which comprises pumping excessive amounts of fuel from a main source into a secondary source to maintain a localized pond in the secondary source having a relatively high liquid level, agitating the liquid in the pond at a level materially below the top of the pond to eliminate bubbles without beating air into the liquid, and pumping agitated bubble-freed fuel from said pond in the secondary source at a level below said liquid level of the pond therein.

8. The method of preventing vapor lock in the fuel systems of internal combustion engines which comprises separating a relatively small pond of fuel from a relatively large pond of fuel, agitating the fuel in the small pond to liberate vapors from the fuel and form a stabilized liquid fuel, pumping stabilized liquid fuel from the small pond, feeding fuel from the large pond to the small pond to replace the amount of fuel pumped from the small pond, mixing the fuel fed into the small pond with agitated fuel in the small pond, and agitating the mixture.

9. The method of eliminating vapor lock in an aircraft fuel system even at high altitudes which comprises feeding fuel from an aircraft fuel source into a secondary source for forming a small pond of fuel of appreciable depth, agitating fuel in the small pond at a level materially below the surface of the pond to beat out bubbles of gas and vapor from the fuel without incorporating air into the fuel, forming a lateral stream of bubble rich fuel in the small pond, pumping agitated bubble freed fuel from the bottom portion of the small pond, feeding fuel from the fuel source into the lateral stream of bubble rich fuel in the small pond to replace the fuel pumped from the pond and form a mixture with the bubble-rich fuel, allowing the mixture to rise in the pond to burst the occluded bubbles at the surface of the pond, and agitating the mixture to liberate additional bubbles therefrom.

10. In combination, a main tank, a secondary tank supported in said main tank, vents joining the upper portion of the secondary tank with the main tank, a pump in said secondary tank having an inlet communicating with the bottom portion of the secondary tank, an impeller in said pump for pumping fluid from the inlet, means defining a passageway joining the lower portion of the main tank with the secondary tank, and a second impeller on said pump for pumping fluid from the main tank through said passageway into the secondary tank.

11. A pump and motor unit comprising a pump casing defining a pumping chamber having an axial inlet and a peripheral outlet, a motor support on said casing spaced axially from said inlet, an electric motor mounted on said support, a shaft extending from said motor through said pump casing, an impeller on said shaft in said pumping chamber for pumping fluid from the inlet to the outlet, a vapor-separating propeller on said shaft adjacent said inlet for rejecting vapors from fluid flowing to the inlet, an additional impeller on said shaft beyond said casing, and means defining a passageway for delivering fluid from the additional impeller to the vapor-separating propeller.

12. In an aircraft fuel assembly, a main fuel tank, a secondary tank in said main tank, means defining a passageway connecting the main and secondary tanks, a pumping means in said passageway to impel fuel from the main tank to the secondary tank, means connecting the interiors of the secondary tank and main tank to relieve excess fuel from the secondary tank back to the main tank, and an electric motor pump driven unit in said secondary tank for pumping fuel out of the secondary tank, said unit having a vapor-separating impeller thereon to eliminate vapor from liquid fuel being pumped, and means for venting liberated vapors out of the secondary tank.

13. A tank arrangement comprising a main tank, means defining a compartment in said main tank having an inlet communicating with the bottom portion of the main tank, a pump and electric motor unit in said compartment, said pump of said unit having an inlet communicating with said compartment and an outlet extending to the outside of said main tank, a first impeller in said pump for pressuring fluid from the compartment to said outlet, said pump having a secondary impeller in said inlet of said compartment for propelling fluid from the main tank into said compartment, and means venting said compartment to the atmosphere.

14. Pumping mechanism for liquid fuel, comprising a casing having an impeller chamber and an outlet for the chamber, an impeller in the chamber, a reservoir extending above the impeller chamber constituting a supply passage therefor and having an opening at its upper end to permit liquid to spill from the reservoir, and pumping means for pumping liquid into the reservoir and having greater pumping capacity than the impeller, and a discharge conduit for the pumping means having its discharge end communicating with the reservoir below the opening to deliver liquid to the reservoir and to the opening.

RUSSELL R. CURTIS.

REFERENCES CITED

The following references are of record in the file of this patent:

UNITED STATES PATENTS

| Number | Name | Date |
|---|---|---|
| 367,564 | Wade and Cherry | Aug. 2, 1887 |
| 1,398,315 | Cawthra | Nov. 29, 1921 |
| 1,437,861 | Porter | Dec. 5, 1922 |
| 1,682,336 | Hentschel | Aug. 28, 1928 |
| 1,690,565 | Wheeler | Nov. 6, 1928 |
| 1,842,156 | Edwards | Jan. 19, 1932 |
| 1,849,059 | Dodson | Mar. 15, 1932 |
| 1,899,396 | Ray | Feb. 28, 1933 |
| 2,000,874 | Babb | May 7, 1935 |
| 2,056,259 | Cummins | Oct. 6, 1936 |
| 2,238,502 | Muir et al. | Apr. 15, 1941 |
| 2,281,053 | Seney et al. | Apr. 28, 1942 |
| 2,300,332 | Avigdor | Oct. 27, 1942 |
| 2,418,184 | McConaghy | Apr. 1, 1947 |

FOREIGN PATENTS

| Number | Country | Date |
|---|---|---|
| 128,260 | Great Britain | June 26, 1919 |